United States Patent [19]

Cunard

[11] Patent Number: 4,966,419
[45] Date of Patent: Oct. 30, 1990

[54] KNOCK-DOWN WHEEL ASSEMBLY

[75] Inventor: Joel C. Cunard, Bedford, Pa.

[73] Assignee: Hedstrom Corporation, Bedford, Pa.

[21] Appl. No.: 201,456

[22] Filed: Jun. 2, 1988

[51] Int. Cl.⁵ .................. B60B 27/00; B60B 37/00
[52] U.S. Cl. .................. 301/2.5; 301/105 B; 301/124 H
[58] Field of Search ............ 301/2.5, 105 R, 105 B, 301/105 S, 1, 111, 112, 114, 115, 122, 124 H, 131

[56] References Cited

U.S. PATENT DOCUMENTS

| | | | |
|---|---|---|---|
| 1,373,707 | 4/1921 | Bennett | 301/2.5 |
| 1,599,702 | 9/1926 | Ferris | 301/2.5 |
| 2,994,559 | 8/1961 | Carlson | 301/2.5 |
| 3,199,922 | 8/1965 | Krenz | 301/105 B X |
| 3,241,894 | 3/1966 | Duffy | 301/105 B X |
| 3,431,025 | 3/1969 | Smith | 301/59 |
| 4,049,319 | 9/1977 | Hartung | 301/2.5 X |

Primary Examiner—Russell D. Stormer
Attorney, Agent, or Firm—Nutter, McClennen & Fish

[57] ABSTRACT

A welded spoke wheel having a specially designed hub and knock-down crank shaft. The hub is a cylindrical tube with welded end caps. The crank shaft is assembled from a center shaft and two outer shafts. The outer shafts have radial tabs which engage axial slots formed in the center shaft. A flange is welded to each of the outer shafts to provide a surface for enabling the outer shafts to be secured to the hub end caps. This axially and rotationally locks the crank shaft to the hub.

11 Claims, 2 Drawing Sheets

KNOCK-DOWN WHEEL ASSEMBLY

FIELD OF THE INVENTION

This invention relates generally to wheel construction, and particularly to a knock down wheel assembly used for the front wheel of a tricycle.

BACKGROUND OF THE INVENTION

Welded spoke wheels have been available for a number of years. Such wheels are relatively strong and inexpensive, and thus have found wide use in tricycles and sidewalk bicycles. During manufacture of a welded spoke wheel, the inner ends of wheel spokes are positioned at opposing ends of a cylindrical center tube which serves as a wheel hub. Circular end caps are then placed against the inner ends of the spokes in register with the tube ends, and the caps are welded to the tube so that the spokes are caught in the weld. Axle openings are punched in the end caps, prior to welding them to the tube, to accommodate a wheel axle.

It is also known that welded spoke wheels may be used with pedal cranks to form a tricycle front wheel. To achieve this the circular end caps are formed with slots or keyholes which engage radially extending tapered tabs formed in a pedal crank shaft. The pedal crank shaft is then inserted through the axle openings in the end caps. This assembly process is usually completed at the factory.

However, welded spoke tricycle wheels are not especially economical to ship. In particular, a shipping carton must be used which is at least as tall as the wheel diameter and at least as wide as the distance between the outermost ends of the pedal cranks. Since these two dimensions tend to be approximately equal, flat and narrow cartons, which are easier to handle than wide or large cartons, cannot be used for shipping a welded-spoke tricycle front wheel.

SUMMARY OF THE INVENTION

It is an object of this invention to provide a low cost welded spoke wheel assembly suitable for use as a tricycle front wheel.

Another object is to provide a new technique for axially and rotationally locking a knock-down crank shaft to a wheel hub.

Briefly, a wheel constructed in accordance with the invention is much the same as a conventional welded spoke wheel, except that the pedal crank shaft is not unitary. Rather, the crank shaft comprises several pieces which can be assembled and secured to the hub by using conventional hand tools.

In particular, the crank shaft is formed from a center shaft and two outer shafts. The center shaft is a tube that is inserted through the axle openings in the hub end caps, and the two outer shafts, which serve as pedal cranks, are telescoped into opposing ends of the center shaft. The angular positions of the outer shafts are maintained relative to the center shaft by mating radially extending tabs formed in the outer shafts which key into corresponding slots formed in the ends of the center shaft.

The crank shaft also includes flanges which are used to secure the pedal cranks to the hub. Specifically, a flange is present on each outer shaft, near the outside ends of the radially extending tabs, so that the flange is positioned adjacent the corresponding hub end cap when that outer shaft is mated to the center shaft. Screw holes, tabs, or other fastening means are provided to firmly attach these flanges to the hub end caps.

There are several advantages to this arrangement. It uses low cost welded spoke construction, yet the wheel can be shipped in a knocked-down state, giving it the advantage of compactness for purposes of shipment. Because the final wheel assembly steps can be completed by the customer with simple hand tools, the manufacture of the assembly is less labor intensive than the manufacture of a conventional tricycle front wheel, which must be completely assembled at the factory.

BRIEF DESCRIPTION OF THE DRAWINGS

While this invention is pointed out with particularity in the appended claims, its nature may be better understood by referring to the following detailed description together with the accompanying drawing, in which:

DETAILED DESCRIPTION OF AN ILLUSTRATIVE EMBODIMENT

Figure 1:
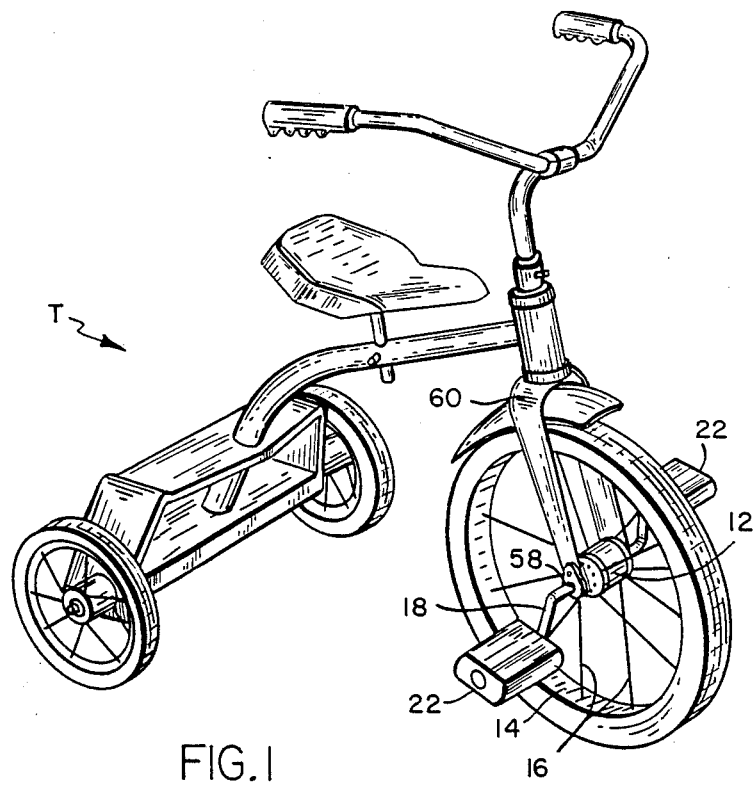
FIG. 1 is a perspective view of a tricycle incorporating a tricycle front wheel knock-down assembly according to this invention.

Referring now to FIG. 1, there is shown a tricycle T having a front wheel assembly 10 incorporating this invention. The wheel assembly 10 includes a hub 12, wheel rim 14, radial spokes 16, crank shaft 18, and pedals 22. While the invention may be incorporated into any conventional tricycle front wheel, the wheel 10 is of the welded spoke type, with the radially inner ends of spokes 16 being welded to the hub 12 such as was described, for example, in U.S. Pat. No. 3,431,025 to Bruce Smith issued Mar. 4, 1969. However, the wheel assembly 10 is also of the knock-down type, meaning that crank shaft 18 is not attached to the hub 12 in the factory, but rather by the customer.

Figure 2:
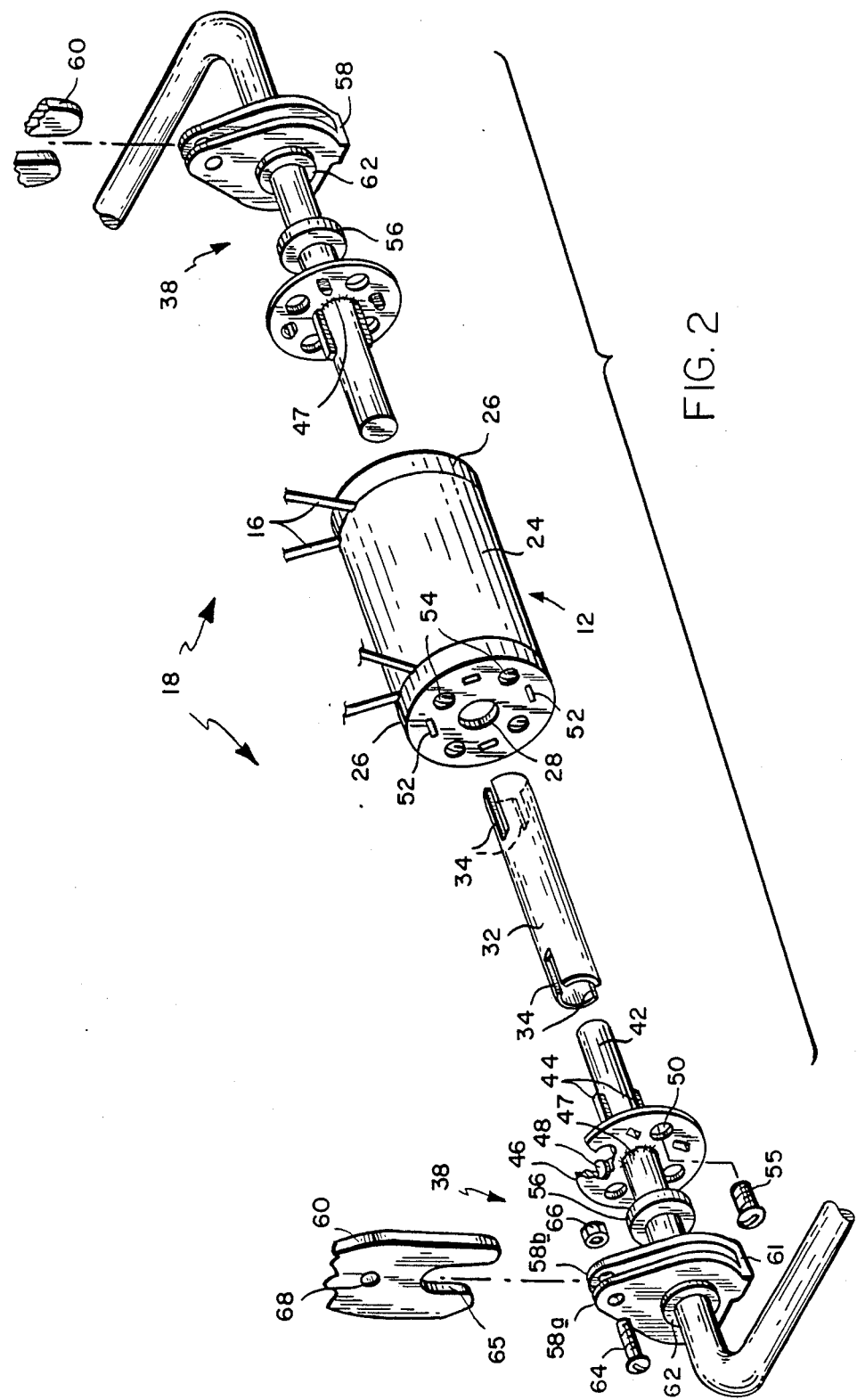
FIG. 2 is a perspective exploded view on a larger scale of the assembly.

Turning attention now to FIG. 2, the construction of the crank shaft 18 and its assembly to the hub 12 may be better understood with reference to that figure. The hub 12 includes a cylindrical tube 24 and two end caps 26. The tube 24 is rolled from sheet metal or cut from a piece of metal tube stock. The assembly of hub 12 is then completed as for any conventional welded spoke wheel. That is, first, the inner ends of spokes 16 are placed adjacent opposing ends of cylindrical tube 24. Next, the end caps 26 are positioned against the ends of the spokes 16 at the opposite of the tube. Finally, welds are made along the outer diameter of the cylindrical tube 24 to secure the end caps 26 and spokes 16 to tube 24.

Figure 3:
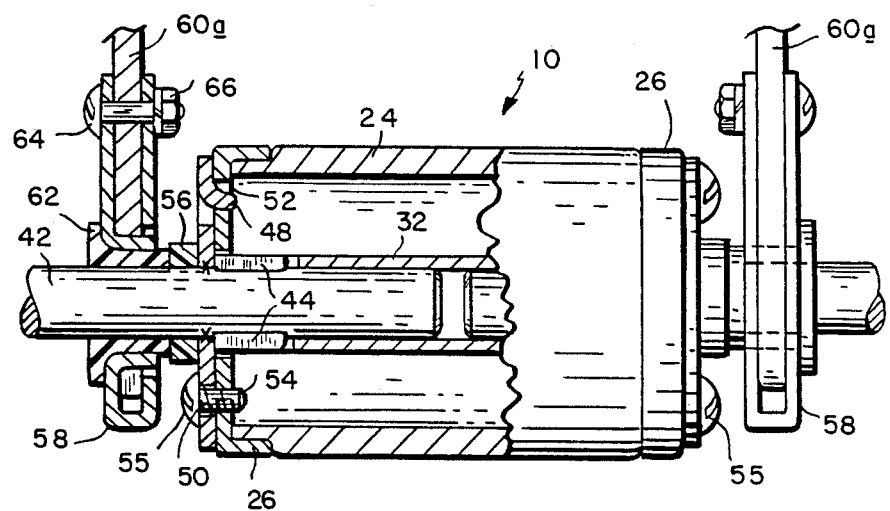
FIG. 3 is a view in side elevation on a still larger scale and with parts broken away to illustrate the fully assembled wheel assembly.

The end caps 26 are punched from sheet metal. Each cap 26 has axial opening 28 sized to accommodate the crank shaft 18. Caps 26 differ from conventional welded-spoke wheel end caps in that fastening means, such as cap slots 52 and cap threaded holes 54, are formed in the faces of caps 26. Although the illustrated embodiment shows the slots 52 and threaded holes 54 alternately spaced about opening 28, other arrangements can be used. The cap slots 52 and cap threaded holes 54 allow the hub 12 to be axially and rotationally locked to the crank shaft 18, so that hub 12 and thus the entire wheel 10 will rotate when crank shaft 18 is turned. The assembly of hub 12 to crank shaft 18 is discussed in more detail in connection with FIG. 3.

Still referring to FIG. 2, the crank shaft 18 comprises a center shaft 32 and two pedal cranks 38. Center shaft 32, cut from appropriate metal tube stock, has the same length as the axial width of the assembled hub 12. At least one axial slot 34 is formed in each end of the center shaft 32. In the embodiment shown, the slots 34 are formed in diametrically opposing pairs.

Each pedal crank 38 is constructed from an outer shaft 42, a flange 46, a washer 56, and a fork connection bracket 58. Each outer shaft 42 includes radially extending tabs 44 adjacent to its inner end. The tabs 44 are formed by striking shaft 42. The tabs 42 have the appropriate shape, number, and size to engage in the slots 34 formed in the center shaft 32. Thus, in the instance shown, there are a pair of diametrically opposite tabs formed on each shaft 42. The opposite or outer ends of pedal cranks 38 carry the usual pedals 22 (not shown in FIG. 2).

The flanges 46 are formed as metal disks having a central hole 47 of more or less the same diameter as the outer diameter of outer shaft 42. Flanges 46 are positioned on the shafts 42 outboard of and adjacent to the shaft tabs 44, and rotationally locked to their respective shafts 42 by spot welding the edges of holes 47 to the shafts. Flanges 46 also include keying or fastening means such as tabs 48 or flange holes 50. Each tab 48 is designed to engage in one or another of the slots 52 in the corresponding end cap 26. Flange holes 50 have the same inner diameter as the cap threaded holes 54.

The washer 56 followed by the fork connection bracket 58 is slid onto each outer shaft 42 so that those elements are positioned outboard of the corresponding flange 46.

The brackets 58 allow the wheel assembly 10 to be mounted to the front fork 60 of the tricycle T. Accordingly, each bracket 58 includes a pair of closely spaced-apart legs 58a and 58b. Each leg 58a and 58b contains an aligned hole 61 for receiving a plastic bushing 62 which, in turn, rotatively receives one of the pedal crank outer shafts 42. An aligned hole 70 is present in the upper end of each leg 58a and 58b to receive a threaded fastener, such as machine screw 64 and nut 66. A correspondingly sized hole 68 is formed in each fork 60. Each fork 60 also includes a vertical slot 65 on its lowermost portion.

To complete the assembly of the pedal crank 38, the brackets 58 are slid onto the pedal crank outer shafts 42, outboard of flanges 46, prior to attaching the pedals 22 to those shafts. Preferably, the washers 56 are also positioned on the shafts 42 between the brackets 58 and the flanges 46 to space those two elements apart. The assembled pedal crank 38 can now be packaged for shipment together with other, unassembled parts of the tricycle T, including the center shaft 32, welded spoke hub 12, and fork 60. Unlike previous wheels, the present wheel assembly 10 does not have a unitary crank shaft. Rather, as noted previously, the crank shaft 18 includes a center shaft 32 and pedal cranks 38 which are assembled to the hub 12 by the customer using ordinary hand tools. The crank shaft 18 of this wheel 10 thus requires a shipping carton only as deep as the hub 12 is long.

The pedal cranks 38 are received into opposite ends of the center shaft 32 when the tricycle T is assembled by the customer. This final assembly procedure can be understood by continuing to refer to FIG. 2, together with the broken away side elevational view of FIG. 3.

More particularly now, the center shaft 32 is first placed through the axial openings 28 in the hub end caps 26 of the hub 12. Next, the pedal cranks 38 are mated to the center shaft 32 by keying tabs 44 into slots 34 so that the two cranks are 180° out of phase, and so that the flange holes 50 are aligned with cap threaded holes 54. This sub-assembly is secured to the hub by inserting machine screws 55 through the flange holes 50 and turning them down into the cap threaded holes 54.

Hub 12 and pedal cranks 38 are then mounted to the tricycle fork 60 by sliding brackets 58 onto the ends of the fork so that the vertical slots 65 receive the bushings 62. When the brackets 58 are properly seated on the ends of the fork 60, the holes 70 in the brackets 58 are aligned with the holes 68 in the fork end. The brackets 58 are then secured to the fork 60 by inserting machine screws 64 through the registering holes 68 and 70 and tightening nuts 66 onto the ends of the screws as shown.

Thus, even though the hub 12 is primarily constructed from a relatively thin sheet metal tube 24, the tube 24 in combination with the shafts 42 and center tube 32 makes a very strong axle once assembled by the customer.

Although the foregoing description has been limited to a specific embodiment of this invention, it will be apparent that variations and modifications may be made to the invention, with the attainment of some or all of the advantages of the invention. Also, other fastening and assembly arrangements are possible. For example, the center shaft 34 can be formed from solid rod stock and have tabs formed thereon, and the outer shafts can be formed from tube stock with slots. Arrangements other than the slots and machine screws can be used to secure the flanges 46 to the end caps 26 as well. And while the foregoing embodiment of the invention has been shown to be particularly advantageous with pedal crank tricycle wheels, it will now also be evident that the invention can be applied to other velocipedes, such as sidewalk bicycles, which have pedals directly fastened to wheels. Therefore, it is the object of the appended claims to cover all such variations and modifications as come within the true spirit and scope of the invention.

What is claimed as new and desired to be secured by Letters Patent of the United States is:

1. A wheel assembly comprising:
   A. a wheel including a hub composed of a tube, and first and second end caps secured to opposing ends of the tube, the end caps having axially aligned openings;
   B. a center shaft for receiving in said openings and bridging the end caps;
   C. first and second crank-shaped outer shafts, said outer shafts having corresponding first end segments for extending toward one another through the respective cap openings coaxially with said center shaft;
   D. interfitting means on said center and said outer shafts for rotatively locking said first end segments to the opposite ends of said center shaft;
   E. flanges on said outer shafts adjacent to said first end segments thereof, said flanges being disposed opposite the respective end caps when the outer shafts are rotatively locked to the center shaft; and
   F. means for securing the flanges to the respective end caps.

2. A wheel assembly as defined in claim 1 and further including:

G. means engaged on said outer shafts adjacent to said formed flanges for rotatively mounting said outer shafts to a velocipeded fork.

3. A wheel assembly as defined in claim 1 wherein the interfitting means comprises:
   G. a pair of diametrically opposing slots formed in each end of said center shaft; and
   H. a pair of diametrically opposing radially extending tabs formed on each of said outer shafts;

4. A wheel assembly as defined in claim 1 wherein the means for securing the flanges comprises:
   G. a flange tab, formed on an interior face of each flange; and
   H. a cap slot formed in each of the end caps and mating with said flange tab.

5. A wheel assembly as defined in claim 4 wherein the interfitting means comprise:
   G. a pair of diametrically opposing slots formed in each of said outer shafts; and
   H. a pair of diametrically opposing radially extending tabs formed on each end of said center shaft;

6. A wheel assembly comprising:
   A. a center shaft having a radially extending slot formed on each one of its opposing ends;
   B. a wheel including a hub composed of a tube and first and second end caps secured to opposing ends of the tube, the end caps having axially aligned openings to accommodate the center shaft;
   C. first and second outer shafts, each having a radially extending shaft tab disposed at one end, the shaft tab adapted to engage one end of the center shaft at one of the radially extending slots, and each shaft having a flange disposed adjacent the tab;
   D. means for securing the flange of the first outer shaft to the first end cap; and
   E. means for securing the flange of the second outer shaft to the second end cap.

7. The wheel assembly of claim 6 wherein the center shaft has a pair of diametrically opposing slots formed on each end and the first and second outer shafts each have a pair of diametrically opposing radially extending tabs.

8. The wheel assembly of claim 6 wherein the means for securing the flange of the first outer shaft comprises:
   F. a flange tab, formed on an interior surface of the flange on the first outer shaft; and
   G. a cap slot, formed in the first end cap, and adapted to engage the flange tabs formed in the flange of the first outer shaft.

9. The wheel assembly of claim 8 wherein the means for securing the flange of the second outer shaft comprises:
   H. a flange tab, formed on an interior surface of the flange on the second outer shaft; and
   I. a cap slot, formed in the second end cap, and adapted to engage the flange tab formed in the flange of the second outer shaft.

10. The wheel assembly of claim 6 wherein the means for securing the flange of the first outer shaft comprises:
    F. a flange threaded hole formed perpendicular to a surface of the flange in the first outer shaft;
    G. a cap threaded hole formed in the first end cap; and
    H. a screw threaded through the flange hole and the cap threaded hole in the first outer shaft and first end cap.

11. The wheel assembly of claim 10 wherein the means for securing the flange of the second outer shaft comprises:
    I. a flange threaded hole formed perpendicular to a surface of the flange on the second outer shaft;
    J. a cap threaded hole formed in the second end cap; and
    K. a screw threaded through the flange hole and the cap threaded hole in the second outer shaft and the second end cap.

* * * * *